(12) United States Patent
Goto et al.

(10) Patent No.: US 7,866,706 B2
(45) Date of Patent: Jan. 11, 2011

(54) THREADED JOINT FOR STEEL PIPE

(75) Inventors: Kunio Goto, Osaka (JP); Ryuichi Imai, Osaka (JP); Yasuhiro Ogawa, Tokyo (JP); Junichi Minami, Tokyo (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 654 days.

(21) Appl. No.: 11/547,067

(22) PCT Filed: Apr. 5, 2005

(86) PCT No.: PCT/JP2005/006672
§ 371 (c)(1),
(2), (4) Date: Oct. 2, 2006

(87) PCT Pub. No.: WO2005/098300
PCT Pub. Date: Oct. 20, 2005

(65) Prior Publication Data
US 2008/0277925 A1    Nov. 13, 2008

(30) Foreign Application Priority Data
Apr. 6, 2004 (JP) .............................. 2004-112030

(51) Int. Cl.
*F16L 15/00* (2006.01)
(52) U.S. Cl. ......................... 285/94; 285/333; 285/390
(58) Field of Classification Search .................... 285/94, 285/333, 334, 355, 390
See application file for complete search history.

(56) References Cited

U.S. PATENT DOCUMENTS

| | | | | |
|---|---|---|---|---|
| 3,849,323 A | * | 11/1974 | Hollinshead | 508/308 |
| 3,869,393 A | * | 3/1975 | Booker | 508/167 |
| 3,996,398 A | * | 12/1976 | Manfredi | 427/451 |
| 4,256,811 A | * | 3/1981 | Black | 428/562 |
| 4,468,309 A | * | 8/1984 | White | 427/528 |
| 4,474,651 A | * | 10/1984 | Yauchi et al. | 285/329 |
| 4,527,815 A | * | 7/1985 | Frick | 285/55 |
| 4,630,849 A | * | 12/1986 | Fukui et al. | 285/55 |
| 4,692,988 A | * | 9/1987 | Shulver et al. | 29/458 |
| 4,758,025 A | * | 7/1988 | Frick | 285/55 |
| 4,813,714 A | * | 3/1989 | Fairey et al. | 285/94 |
| 4,830,411 A | * | 5/1989 | Tsuru et al. | 285/334 |
| 4,871,194 A | * | 10/1989 | Kawashima et al. | 285/55 |

(Continued)

FOREIGN PATENT DOCUMENTS

JP    61-079797    4/1986

(Continued)

*Primary Examiner*—James M Hewitt
(74) *Attorney, Agent, or Firm*—Clark & Brody

(57) ABSTRACT

A threaded joint for a steel pipe comprises a pin and a box with a contact surface having a threaded part and a unthreaded metal contact part, wherein a solid lubricating film containing one or more kinds of lubricating powders selected from graphite, mica, calcium carbonate and kaolin, a copper powder, and a binder is formed on at least one contact surface of the pin and the box. An object of the present invention is to provide a threaded joint for a steel pipe which allows for repeated fastening and loosening of a threaded joint without adversely influencing on a human body and environment, and is excellent in galling resistance, rust preventing property and gas tightness.

7 Claims, 3 Drawing Sheets

U.S. PATENT DOCUMENTS

| | | | | |
|---|---|---|---|---|
| 5,253,902 | A * | 10/1993 | Petelot et al. | 285/94 |
| 5,678,608 | A * | 10/1997 | Fontana | 138/96 T |
| 6,017,857 | A * | 1/2000 | Heimann et al. | 508/136 |
| 6,027,145 | A * | 2/2000 | Tsuru et al. | 285/94 |
| 6,394,190 | B2 * | 5/2002 | Linden | 173/1 |
| 6,659,509 | B2 * | 12/2003 | Goto et al. | 285/94 |
| 6,679,526 | B2 * | 1/2004 | Yamamoto et al. | 285/55 |
| 6,746,057 | B2 * | 6/2004 | Goto et al. | 285/333 |
| 6,827,996 | B2 * | 12/2004 | Goto | 428/36.9 |
| 6,869,111 | B2 * | 3/2005 | Goto et al. | 285/333 |
| 6,933,264 | B2 * | 8/2005 | Petelot | 508/318 |
| 7,360,798 | B2 * | 4/2008 | Matsumoto et al. | 285/94 |
| 2003/0066641 | A1 * | 4/2003 | Yamamoto et al. | 166/242.6 |
| 2003/0094810 | A1 * | 5/2003 | Goto et al. | 285/94 |
| 2003/0111838 | A1 * | 6/2003 | Goto et al. | 285/94 |
| 2003/0159764 | A1 * | 8/2003 | Goto | 148/519 |
| 2003/0160446 | A1 * | 8/2003 | Goto et al. | 285/94 |
| 2004/0195825 | A1 * | 10/2004 | Anraku et al. | 285/94 |
| 2004/0195826 | A1 * | 10/2004 | Goto | 285/94 |
| 2006/0197343 | A1 * | 9/2006 | Imai et al. | 285/333 |
| 2006/0228505 | A1 * | 10/2006 | Goto et al. | 428/36.9 |
| 2008/0217916 | A1 * | 9/2008 | Nagasaku et al. | 285/334 |

FOREIGN PATENT DOCUMENTS

| | | |
|---|---|---|
| JP | 2-85593 | 3/1990 |
| JP | 3-78517 | 12/1991 |
| JP | 5-59401 | 3/1993 |
| JP | 05-117870 | 5/1993 |
| JP | 05-149485 | 6/1993 |
| JP | 06-010154 | 1/1994 |
| JP | 08-103724 | 4/1996 |
| JP | 08-105582 | 4/1996 |
| JP | 08-233163 | 9/1996 |
| JP | 08-233164 | 9/1996 |
| JP | 09-072467 | 3/1997 |
| JP | 2001-317549 | 11/2001 |
| JP | 2002-173692 | 6/2002 |
| JP | 2002-257270 | 9/2002 |
| JP | 2003-042354 | 2/2003 |

* cited by examiner

THREADED JOINT FOR STEEL PIPE

TECHNICAL FIELD

The present invention relates to a screw joint (threaded joint) for a steel pipe which can be used without coating a compound grease which has conventionally been used upon fastening of a threaded joint for an oil well pipe and, at the same time, does not adversely affect on the earth environment and a human body, and is excellent in galling resistance, and a process for manufacturing the same.

BACKGROUND ART

In a tubing and a casing used in digging an oil well, a threaded joint is generally used. Usually, a depth of an oil well is 2000 m to 3000 m. However, in a deep oil well such as a marine oil field in recent years, a depth of an oil well reaches 8000 m to 10000 m. An axial tensile force due to a weight of an oil well pipe and a joint themselves and a pressured which is complexed of an internal and external pressure, and heat in the ground exert on a threaded joint for fastening these oil well pipes under the use environment. Therefore, a threaded joint used in an oil well pipe is required to retain gas tightness without damage even under such the environment. In addition, at work of falling a tubing and a casing into an oil well, a once fastened joint is loosened due to a variety of troubles, they are once pulled out from an oil well, and the joint is fastened again, which is fallen.

API (American Petroleum Institute) requires that, even when fastening (makeup) and loosening (breakout) are performed ten times in a tubing joint, or three times in a casing joint, seizure called galling does not occur, and gas tightness is retained. In a threaded joint, usually, a male thread is formed at an end part of an oil well pipe, and a female thread is formed on an internal surface of a threaded joint member. And, by fitting a unthreaded metal contact part formed at a tip of a male thread and a unthreaded metal contact part formed at a base of a female thread, and fastening them, whereby, unthreaded metal contact parts area butted, and a metal seal part is formed. Upon fastening, galling resistance and gas tightness are improved by coating a viscous liquid lubricant containing a heavy metal powder, called "compound grease". In addition, a threaded part and a unthreaded metal contact part of a threaded joint are subjected to surface treatment for the purpose of improving retainability of a compound grease and improving slidability.

However, since a high surface pressure exceeding a yield point of a threaded joint material is acted particularly on a unthreaded metal contact part of a threaded joint, galling easily occurs. Previously, various threaded joints in which galling resistance at such the site is improved have been proposed. For example, JP-A No. 61-79797 discloses a threaded joint in which a threaded part is plated with zinc (Zn) or tin (Sn), and a metal sealing part (unthreaded metal contact part) is plated with gold (Au) or platinum (Pt). JP-B No. 3-78517 discloses a pipe joint in which a film of a synthetic resin with molybdenum disulfide ($MoS_2$) having a particle diameter of 10 μm or smaller dispersed therein at a ratio of 20 to 90% is formed. In addition, JP-A No. 8-103724 discloses a method of treating a surface of a steel pipe joint by forming a resin film containing molybdenum disulfide on a film layer chemically treated with manganese phosphate. Further, JP-A No. 8-105582 discloses a method of treating a surface of a pipe joint in which a nitrification-treated layer is a first layer, an iron-plated layer or an iron alloy-plated layer is a second layer, and a third layer of a resin film containing molybdenum disulfide is formed thereon.

All of threaded joints disclosed in the aforementioned respective patent references are on presume that a compound grease is used. This grease contains a heavy metal powder such as zinc, lead and copper, and since a coated grease is washed out at connecting of threads, and a coated grease is overflown on an outer surface at fastening in some cases, it is thought that this adversely affects on the environment, particularly, marine organisms. In addition, work of coating a compound grease has not only the worse working environment, but also feared harmfulness on a human body. Therefore, development of a threaded joint without using a compound grease is demanded.

However, it is difficult for the aforementioned previous techniques to ensure performance required for the aforementioned threaded joints. For example, it goes without saying that techniques disclosed in JP-A No. 5-117870, JP-A No. 6-10154, JP-A No. 5-149485 and JP-A No. 2-885593 in which coating of a compound grease stipulated in API standard BUL 5A2 is kept in mind at fastening of a threaded joint have a problem of an adverse effect on the earth environment and a human body.

In recent years, based on OSPAR Treaty (Oslo•Paris Treaty), discharge of substances harmful on the earth environment and substances having influence on a human body is being strictly regulated in development of a well of a natural gas and a petroleum. OSPAR Treaty was established by unifying Oslo Treaty and Paris Treaty regarding prevention of marine pollution in 1992, and it was settled that marine environmental protection in Northeast Atlantic Ocean is progressed. In this OSPAR Treaty, an idea of prevention principle is incorporated as general duty of Contracting States, and this is a first framework having a lawful restriction force. OSPAR Treaty was ratified by all countries contacting with Northeast Atlantic Ocean, and came into force in 1998. With progression of such the global strict regulation on the environment, a threaded joint which has no adverse effect on the environment and a human body at fastening of an oil well pipe even in work of digging a gas or oil well, and has excellent galling resistance is sought. The compound grease which has been previously used in a threaded joint upon fastening of a steel pipe for an oil well is being restricted in its use in some areas.

As a threaded joint using no compound grease, a threaded joint with a solid lubricant film formed on a surface is proposed. For example, JP-A No. 8-233163, JP-A No. 8-233164 and JP-A No. 9-72467 disclose a threaded joint in which a resin film obtained by dispersing molybdenum disulfide ($MoS_2$) or tungsten disulfide ($WS_2$) in a resin is formed. However, they are degraded under the high temperature environment to generate a sulfurous acid gas (sulfur dioxide: $SO_2$), thus, it is feared that they have not a little effect on the environment.

DISCLOSURE OF THE INVENTION

As explained above, a threaded joint which can be repeatedly used without adversely influencing on the earth environment such as marine organisms and human body, and is excellent in galling resistance has not been obtained now.

An object of the present invention is to provide a threaded joint for a steel pipe which can suppress galling at repeated fastening or loosening without using a liquid lubricant containing a heavy metal powder such as a compound grease and a solid lubricant film containing a harmful substance which are feared to have adverse effect on the earth environment or a human body, and is excellent in galling resistance, and a process for manufacturing the same.

The present inventors studied a threaded joint for a steel pipe provided with a solid lubricant film having no adverse effect on the earth environment or human body, and further a threaded joint for a steel pipe which is not seized even at repeated fastening or loosening. As a result, the present inventors found out that, by forming a solid lubricant film in which one or more lubricating powders selected from graphite, mica, calcium carbonate and kaolin as a lubricating powder, a copper powder and a binder are mixed on a contact surface of a threaded joint, nature of no or little influence on environment or a human body and being excellent in galling resistance is obtained. Further, the present inventors found out that galling resistance, rust preventing property and gas tightness can be improved under high temperature well environment by pre-heating a plain pipe of a threaded joint to a specified temperature, and heat-treating a formed solid lubricating film, upon formation of a solid lubricating film, which resulted in completion of the present invention.

Thus, a first aspect of the present invention is a threaded joint for a steel pipe comprising a pin and a box with a contact surface having a threaded part and a unthreaded metal contact part, respectively, characterized in that a solid lubricating film containing one or more kinds of lubricating powders selected from graphite, mica, calcium carbonate and kaolin, a copper powder and a binder is formed on at least one contact surface of a pin and a box.

According to this threaded joint for a steel pipe of a first aspect, since a solid lubricating film is formed on a contact surface, there is no fear that a substance is washed out or leaked out during the use environment as in the case of use of a flowable compound grease. Therefore, pollution of the environment, in particular, the marine environment due to natural gas or petroleum digging work can be prevented.

In the threaded joint for a steel pipe of a first aspect, a surface of a copper powder may be inactivation-treated. By this treatment, safety of a solid lubricating film can be further enhanced.

In addition, in the threaded joint for a steel pipe of a first aspect (including a variation thereof), a mass ratio (C/B) of a content (C) of a copper powder relative to a content (B) of the lubricating powder in a solid lubricating film is 0.5 to 5.0. In the case of such the construction, galling resistance of the threaded joint for a steel pipe can be further enhanced.

In addition, in the threaded joint for a steel pipe of a first aspect (including each variation), a solid lubricating film may be formed on a contact surface of a box. In this formation, the forming work of the solid lubricating film is easier than the case where the solid lubricating film is formed on the pin. In addition, applying this formation is more economical than the case where the solid lubricating film is formed on both of the pin and the box.

Further, in the threaded joint for a steel pipe of a first aspect (including each variation), a solid lubricating film may be formed on only one contact surface of the pin and the box, and a monolayered or bi- or more-layered film selected from a zinc or zinc alloy film, a metal plating film, a phosphate film, an oxalate film, a borate film and a rust preventing film may be formed on the other contact surface. In the case of such the construction, rust preventing property is imparted also to a side on which no solid lubricating film is formed, thereby, a use value of a threaded joint for a steel pipe can be enhanced.

In addition, in the threaded joint for a steel pipe of a first aspect (including each variation), a solid lubricating film may be formed on a contact surface which has been subjected to any undercoating treatment of acid washing treatment, blasting treatment, zinc or zinc alloy impact plating treatment, metal plating treatment, soft nitrification treatment, composite metal covering treatment, phosphate treatment and oxalate treatment. By such the formation, adherability of a solid lubricating film to a contact surface is strengthened by so-called anchor effect. And a threaded joint for a steel pipe from which a solid lubricating film is peeled with difficulty even under the use environment can be provided.

Further, the threaded joint for a steel pipe of a first aspect (including each variation), a solid lubricating film formed on a contact surface may be heat-treated. By such the treatment, a solid lubricating film formed on a contact surface becomes firm, and galling resistance is improved. In addition, adherability is also increased, and a solid lubricating film which is difficult to be peeled from a contact surface can be obtained.

A second aspect of the present invention is a method of forming a solid lubricating film on a contact surface of the threaded joint for a steel pipe of a first aspect (including each variation), comprising pre-heating a contact surface on which a solid lubricating film is to be formed.

According to this method of forming a solid lubricating film of a second aspect, when a solid lubricating film is coated on a contact surface, dripping of a coating solution and a ununiformity of a film thickness are reduced, and galling resistance performance can be further stabilized.

A third aspect of the present invention is a process for manufacturing a threaded joint for a steel pipe which comprises a pin and a box with a contact surface having a threaded part and a unthreaded metal contact part, respectively, and in which a solid lubricating film is formed on at least one contact surface of a pin and a box, which comprises a process of subjecting a contact surface on which a solid lubricating film is to be formed to any undercoating treatment of acid washing treatment, blasting treatment, zinc or zinc alloy impact plating treatment, metal plating treatment, soft nitrification treatment, composite metal covering treatment, phosphate treatment and oxalate treatment, a process of pre-treating a contact surface on which the solid lubricating film is to be formed, a process of forming the solid lubricating film containing one or more kinds of lubricating powders selected from graphite, mica, calcium carbonate and kaolin, a copper powder and a binder on a contact surface, and a process of heating the formed solid lubricating film.

According to this process for manufacturing a threaded joint for a steel pipe of a third aspect, the threaded joint for a steel pipe of a first aspect (including each variation) can be manufactured by applying the process for forming a solid lubricating film of a second aspect.

The threaded joint for a steel pipe of the present invention has no or little harmfulness on a human body and the environment as compared with the previous liquid lubricant containing a heavy metal powder such as a compound grease and the previous solid lubricating film. In addition, according to the threaded joint for a steel pipe of the present invention, and the process for manufacturing the same, rust preventing property and gas tightness can be enhanced, galling at repeated fastening or loosening can be suppressed, and the effect is maintained even at a high temperature.

BEST MODE FOR CARRYING OUT THE INVENTION

Figure 1:
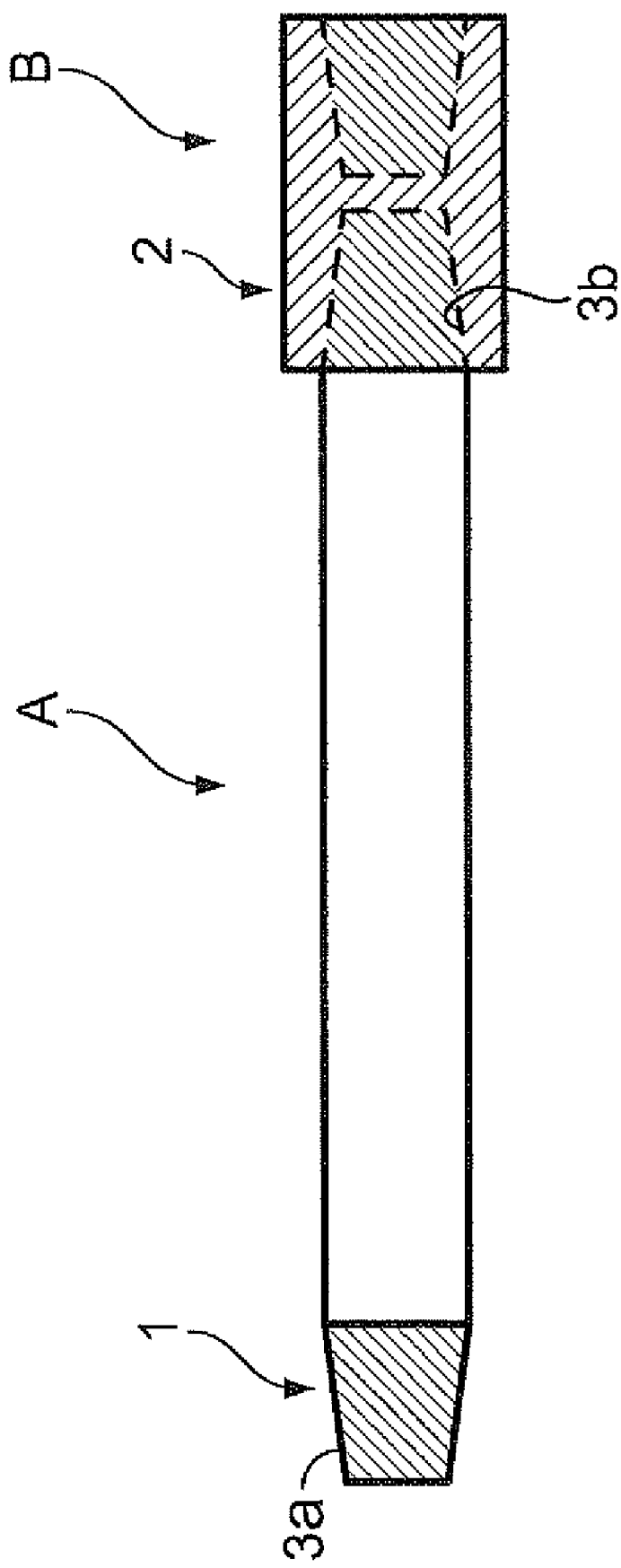
FIG. 1 is an outline view schematically showing an assembling construction of a steel pipe and a threaded joint member at shipping of a steel pipe.

The present invention is a threaded joint for a steel pipe which does not adversely affect on the earth environment and a human body and is excellent in galling resistance, which comprises a pin and a box with a contact surface having a threaded part and a unthreaded metal contact part, respectively, wherein a solid lubricating film is formed on at least one contact surface of the pin and the box. The present invention will be explained below based on embodiments shown in the drawings.

<1. Assembling Construction of Threaded Joint Member>

FIG. 1 is an outline view schematically showing an assembling construction of an oil well pipe and a threaded joint member at shipping of a steel pipe. A steel pipe A is shipped in the state where a box 2 having a female threaded part 3b formed on an internal surface of a threaded joint member B is fastened to one of pins 1 having a male threaded part 3a formed on an external surface of both end parts.

Figure 2:
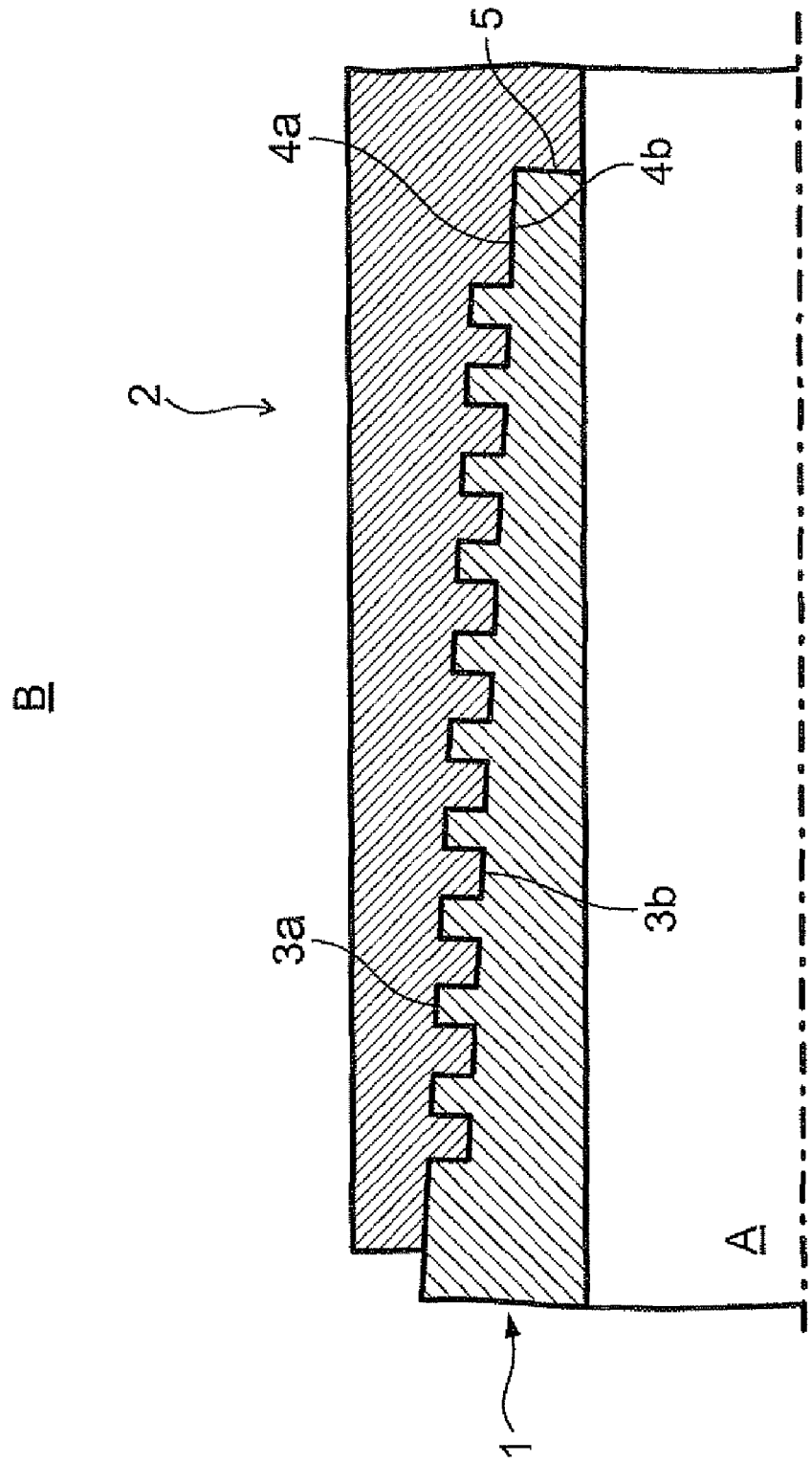
FIG. 2 is an outline view schematically showing a fastening part of a threaded joint for a steel pipe.

FIG. 2 is an outline view schematically showing a construction of a representative threaded joint for a steel pipe (hereinafter, also referred to as "threaded joint"). A threaded joint is constructed of a pin 1 comprising a male threaded part 3a, and a unthreaded metal contact part 4a formed at a tip part, which is formed on an external surface of a steel pipe end part, and a box 2 having a female threaded part 3b, and a unthreaded metal contact part 4b, which is formed on an internal surface of a threaded joint member B. Respective threaded parts 3a, 3b and unthreaded metal contact parts 4a, 4b of the pin 1 and the box 2 are a contact surface of a threaded joint, and this contact surface is required to have galling resistance, gas tightness and rust preventing property. Previously, for this reason, a compound grease containing a heavy metal powder was coated, or a resin film with molybdenum disulfide dispersed therein was formed on the contact surface, but there was a problem on a human body or the environment as described above.

According to the present invention, by forming a solid lubricating film obtained by mixing one kind or two or more kinds of lubricating powders selected from graphite, mica, calcium carbonate and kaolin, a copper powder and a binder on at least one contact surface of the pin 1 and the box 2, influence on environment and a human body becomes extremely small. Herein, it is preferable that a copper powder has been inactivated by surface treatment from a viewpoint that safety of a solid lubricating film formed on a contact surface of the threaded joint of the present invention is further enhanced. Further, it is preferable that, upon formation of a solid lubricating film, at least a contact surface of a threaded joint is pre-heated, and a formed solid lubricating film is heat-treated. By such a treatment, galling resistance, rust preventing property and gas tightness under the high temperature well environment can be also improved.

<2. Roughening of Contact Surface>

Figure 3:
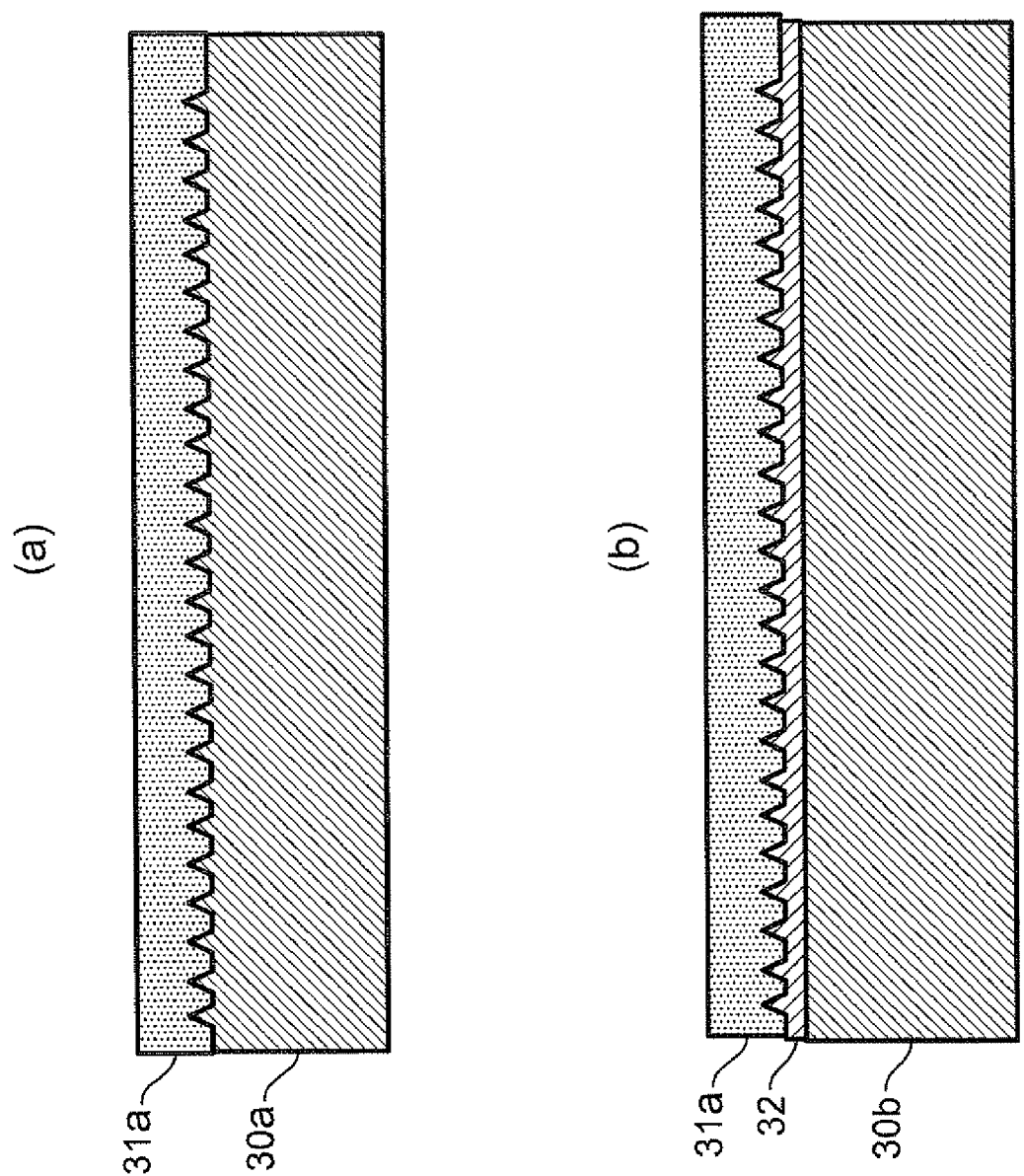
FIG. 3 is a view showing an aspect of roughening of a contact surface.

FIG. 3 shows two aspects of contact surface roughening. It is desirable that, in order to maintain adherability of a solid lubricating film, at least one contact surface of the pin and the box is pre-roughened before formation of a film so that its surface roughness Rmax becomes greater than surface roughness (3 to 5 μm) after machining. In a first aspect of roughening shown in FIG. 3 (a), a steel surface 30a itself is roughened, and a solid lubricating film 31a is formed thereon. Examples of such the roughening method include a method of projecting a sand material such as a shot material having a spherical shape and a grid material having a square shape, and a method of roughening a skin by immersing in a strong acid solution such as sulfuric acid, hydrochloric acid, nitric acid and hydrofluoric acid.

A second aspect of roughening shown in FIG. 3 (b) is to form an undercoating-treated layer 32 which is further rougher than a surface of a steel 30b, and coat a solid lubricating film 31a thereon. In this construction, an undercoating-treated layer 32 intervenes between a contact surface of a steel 30b and a solid lubricating film 31a. Examples of such an undercoating treatment include a method of forming a chemical conversion coating formed by phosphating, oxalate or borate (Roughness of a crystal surface is increased accompanied with growth of a produced crystal), a method of plating a metal such as copper plating and iron plating (Since a convex part is preferentially plated, a surface becomes slightly rougher), an impact plating method of projecting a particle obtained by covering an iron core with zinc or zinc-iron alloy utilizing a centrifugal force or an air pressure to form a zinc or zinc-iron alloy film, a soft nitrification method of forming a nitride layer (e.g. tafftride), and a composite metal covering method of forming a porous film in which a solid fine particle is dispersed in a metal. Examples of an impact plating method include mechanical plating of colliding a particle and a material to be plated in a rotating barrel, and a projection plating method of colliding a particle against a material to be plated using a blast apparatus. A plated film in accordance with an impact plating method is a film in which particles are laminated and connected firm, and this is a porous film in which numbers of fine voids are uniformly distributed between particles.

From a viewpoint of adherability of a solid lubricating film, a porous film, in particular, a film of phosphate chemical treatment (manganese phosphate, zinc phosphate, iron manganese phosphate, calcium zinc phosphate) or a film of zinc or zinc-iron alloy by impact plating is preferable. From a viewpoint of adherability, a manganese phosphate film is more preferable and, from a viewpoint of rust preventing property, a film of zinc or zinc-iron alloy is more preferable.

Since both of a phosphate chemically treated film and a zinc or zinc-iron alloy film formed by impact plating are a porous film, when a solid lubricating film is formed thereon, adherability of a solid lubricating film is enhanced due to so-called "anchor effect" and, as a result, it is difficult to cause peeling of a solid lubricating film even when fastening and loosening are repeated, contact between metals is effectively prevented, and galling resistance, gas tightness and rust preventing property are further improved. In addition, by forming a solid lubricating film on a porous film, the lubricating component is permeated into a porous film, contributing to improvement in rust preventing property.

Formation of a phosphate film layer may be performed by subjecting to a pin or a box to a general chemical treating method such as an immersion method and a spraying method. As a chemical treatment solution, a general acidic phosphate treating solution for a zinc material can be used. Examples include an aqueous acidic phosphate solution containing 1 to 150 g/L of a phosphorus ion, 3 to 70 g/L of a zinc ion, 1 to 100 g/L of a nitric acid ion, and 0 to 30 g/L of a nickel ion. As usual, a liquid temperature is from a normal temperature to 100° C., and a treating time is up to 15 minutes depending on a desired film thickness. In order to promote formation of a film, an aqueous surface adjusting solution containing colloidal titanium may be supplied to a surface in advance. Then, after a phosphate film is formed, this is washed with water or hot water, and dried, and this procedure may be appropriately performed by selection.

A method of forming a projection plating film composed of zinc or zinc alloy is disclosed in JP-B No. 59-9312. According to this method, utilizing a projection material composed of a particle in which a surface of an iron-based core is covered with zinc or zinc alloy, a projection plating film composed of zinc or zinc alloy can be formed on a surface of a threaded joint for a steel pipe of various steel kinds of from a carbon steel to a high alloy steel containing 13% by mass of Cr. Since zinc is a metal which is baser than iron, it is ionized preferentially than iron, and exerts corrosion preventing ability of preventing corrosion of iron.

In the present invention, since only a contact surface of a threaded joint may be plated, a projection plating method which can perform local plating is suitable. Examples of a projecting (blasting) apparatus which is used in projection plating include a high pressure fluid projecting apparatus for blowing a particle utilizing a high pressure fluid such as the compressed air, and a mechanical projecting apparatus utilizing a rotating wing such as an impeller, and any of them may be utilized.

A particle which is used in an impact plating method such as a projection plating method is a metal particle having zinc or zinc alloy at least on a surface. Although a particle in which a whole thereof is composed of zinc or zinc alloy may be used, a projecting material disclosed in JP-B No. 59-9312 is preferable. This projecting material is a particle having a core of iron or iron alloy and a surface covered with zinc or zinc alloy via an iron-zinc alloy layer.

Such the particle can be prepared by a method of covering an iron or iron alloy powder as a core with zinc or zinc alloy (e.g. Zn—Fe—Al) by electroless and/or electrolytic plating, and heat-treating this to form an iron-zinc alloy layer on a plating interface, or a mechanical alloying method. As a commercially available product of such the particle, there is Z Iron manufactured by Dowa Iron Powder Co., Ltd., and this can be also utilized. A content of iron or iron alloy in a particle is preferably in a range of 20 to 60% by weight, and a particle diameter of a particle is preferably in a range of 0.2 to 1.5 mm.

When this particle in which a periphery of an iron-based core is covered with zinc or zinc alloy is projected on a substrate, only zinc or zinc alloy which is a covering layer for a particle is adhered to a substrate, and a film of zinc or zinc alloy is formed on a substrate. This projection plating can form a plating film having better adherability on a steel surface regardless of a material of a steel. Therefore, a porous zinc or zinc alloy layer excellent in adherability can be formed on a contact surface of a threaded joint of various materials from a carbon steel to a high alloy steel.

A thickness of a zinc or zinc alloy layer is not particularly limited, but from a viewpoint of rust preventing property and adherability, the thickness is preferably 5 to 40 µm. When the thickness is less than 5 µm, sufficient rust preventing property can not be maintained in some cases. On the other hand, when the thickness exceeds 40 µm, adherability with a solid lubricating film is rather reduced in some cases.

By such the undercoating treatment, surface roughness Rmax is preferably 5 to 40 µm. When surface roughness is less than 5 µm, adherability or retainability of a solid lubricating film becomes insufficient in some cases. On the other hand, when surface roughness exceeds 40 µm, friction becomes high, a film cannot stand a shearing force and a compressing force when undergoes a high surface pressure, and a solid lubricating film is broken or peeled easily in some cases. When the solid lubricating film of the present invention is formed only on one of a pin and a box, and the other is subjected to such a roughening treatment, its surface roughness Rmax is preferably small as 1 to 10 µm from a viewpoint of maintenance of durability of opposite solid lubricating film.

Of course, it goes without saying that, if there is no such the undercoating treatment, the object of the present invention can be attained only by forming a solid lubricating film on a contact surface.

<3. Solid Lubricating Film>

(3-1) Lubricating Powder

The solid lubricating film of the present invention is a film containing one or more kinds selected from graphite, mica, calcium carbonate and kaolin which are a powder having no adverse effect on environment and a human body and having lubricating action (hereinafter, referred to as "lubricating powder"), a copper powder, and a binder. It is said that all of these lubricating powders have no or little load on marine environment in Oslo•Paris Treaty (OSPAR).

As the lubricating powder of the present invention, any of natural and synthetic powders can be used as far as it is generally commercially available. In addition, a particle diameter of 0.5 to 15 µm is preferable from a viewpoint that uniform dispersity in a solid lubricating film is maintained, and galling resistance and a film strength are enhanced. From a viewpoint of galling resistance, a lubricating powder is preferably graphite and mica, and more preferably graphite. This solid lubricating film can be formed by coating of a dispersion in which a lubricating powder is dispersed in a binder-containing solution. In this film, a lubricating powder is adhered firm to a threaded joint surface directly or via an undercoating-treated film, in the state where dispersed in a binder.

(3-2) Copper Powder

In the present invention, a copper powder together with the lubricating powder is contained in a film. It is preferable that a copper powder is contained at a specified ratio relative to the lubricating powder and, by such the inclusion, extremely superior lubricating effect is exerted. It is preferable that, as a copper powder, not pure copper itself, but a copper powder which has been inactivated by surface improvement is used. Thus, a solid lubricating film having no or little harmfulness on a human body and the environment can be provided.

Examples of a method of inactivating a copper powder by surface improvement include a method of retaining a copper powder in the high temperature atmosphere to form a copper oxide (CuO) film on a surface, a method of heating a copper powder in a stream of hydrogen and hydrogen sulfide to form a copper sulfate ($Cu_2S$) film on a surface, and a method of contacting with a metal inactivating agent such as benzotriazole and thiadiazole to form a film of them on a copper surface.

A copper powder in the present invention may be spherical or scaly, and it is preferable that a length of a longest part is 1 to 20 µm in any case. By such the length, uniform dispersion in a solid lubricating film can be realized, and lubricating effect is improved. From a viewpoint of rust preventing effect, a scaly copper powder is preferable.

(3-3) Binder

As a binder used in the solid lubricating film of the present invention, any of an organic resin and an inorganic polymer compound can be used.

As an organic resin, a resin having heat resistance, and an appropriate degree of hardness and abrasion resistance is suitable. As such the resin, there can be exemplified thermosetting resins such as an epoxy resin, a polyimide resin, a polyamideimide resin, a polycarbodiimide resin, polyether sulfone, polyether ether ketone, a phenol resin, and a furan resin, as well as a polyethylene resin and a silicone resin. From a viewpoint that adherability and abrasion resistance of a solid lubricating film are improved, it is preferable to perform heating curing treatment. A temperature for this heating curing treatment is preferably 120° C. or higher, more preferably 150 to 380° C., and a treating time is preferably 30 minutes or longer, more preferably 30 to 60 minutes. As a solvent used in forming a resin film, various low boiling point solvents include hydrocarbon solvents (e.g. toluene) and alcohols (e.g. isopropyl alcohol) can be used alone, or mixing them.

The inorganic polymer compound is a compound having a structure in which a metal-oxygen bond is three dimensionally crosslinked, such as Ti—O, Si—O, Zr—O, Mn—O, Ce—O and Ba—O. This compound can be formed by hydrolysis and condensation of a hydrolysable organometallic compound, a representative of which is metal alkoxide (hydrolysable inorganic compound such as titanium tetrachloride may be used). As metal alkoxide, compounds in which an alkoxy group is a lower alkoxy group such as methoxy, ethoxy, isopropoxy, propoxy, isobutoxy, butoxy, and tert-butoxy can be used. Preferable metal alkoxide is alkoxide of titanium or silicon. Titanium alkoxide is particularly preferable. Inter alia, titanium isopropoxide is excellent in film forming property, being preferable.

This inorganic polymer compound may contain an alkyl group optionally substituted with a functional group such as amine and epoxy groups. For example, an organometallic compound in which a part of an alkoxy group is substituted with an alkyl group containing a non-hydrolysable functional group such as a silane coupling agent can be used.

When a binder is an inorganic polymer compound, a lubricating powder is added to a solution of metal alkoxide to disperse the powder, the dispersion is coated on at least one contact surface of a pin and a box, moistening-treated and, if necessary, heated to proceed hydrolysis and condensation of metal alkoxide, thereby, a solid lubricating film in which a lubricating powder is dispersed in a film composed of an inorganic polymer compound comprising a metal-oxygen bond is formed. As a solvent for metal alkoxide, various organic solvents such as polar solvents such as alcohol (e.g. ethyl alcohol, isopropyl alcohol, butyl alcohol) and ketone, hydrocarbon, and halogenated hydrocarbon can be used. In order to promote formation of a film, metal alkoxide in a solution may be partially hydrolyzed before coating. In addition, in order to promote hydrolysis after coating, a small amount of water and/or an acid for a hydrolyzing catalyst may be added to a solution of metal alkoxide.

Although moistening treatment for progressing hydrolysis of metal alkoxide can be performed by allowing to stand for a prescribed time in the air, it is desirable to perform moistening treatment in the air at a humidity of 70% or higher. Preferably, after moistening treatment, heating is performed. By heating curing treatment, hydrolysis and condensation of a hydrolysate, as well as discharge of an alcohol which is a byproduct of hydrolysis are promoted, a film can be made in a short time, adherability of a formed solid lubricating film becomes firm, and galling resistance is improved. This heating is preferably performed after evaporation of a dispersing medium. A heating temperature is advantageously a temperature of 100 to 200° C. near a boiling point of an alcohol produced as a byproduct, and blowing of hot air is more effective.

(3-4) Each Component Ratio

It is preferable that a mass ratio (B/A) of a content (B) of a lubricating powder to a content (A) of a binder in a solid lubricating film is 0.3 to 9.0. When this mass ratio is less than 0.3, there is little effect of improving lubricating property of a formed solid lubricating film, and improvement in galling resistance is insufficient. When this mass ratio is greater than 9.0, there arises a problem that adherability of a solid lubricating film is reduced, and peeling of a lubricating powder from a solid lubricating film is remarkable. In the case where galling resistance is further required, for example, in the case where an amount of threaded part interference is strict, the mass ratio is more preferably 0.5 to 7.0. In the case where further galling resistance is required as in a high alloy steel, 0.5 to 5.0 is further preferable. In addition, a mass ratio (C/B) of a content (C) of a copper powder to a content (B) of a lubricating powder is preferably 0.5 to 5.0. When this mass ratio is less than 0.5, effect of improving lubricating property of a formed solid lubricating film is small, and improvement in galling resistance is insufficient. When this mass ratio is greater than 5.0, there is fear that an adhering strength of a solid lubricating film and deforming ability of a film are reduced, peeling of a solid lubricating coating film is remarkable, and lubricating effect cannot be maintained during repeated fastening or loosening. From a viewpoint of the reinforcing effect of a lubricating powder and coating property at formation of a solid lubricating film, a mass ratio is more preferably 0.5 to 3.0.

(3-5) Film Thickness

A thickness of a solid lubricating film is desirably 5 μm or larger. A lubricating powder contained in a lubricating film is spread on a total contact surface when undergoes a high surface pressure, and exerts excellent galling resistance. When a thickness of a lubricating film is less than 5 μm, an absolute amount of a contained lubricating powder becomes small, effect of improving lubricating property is reduced, and rust prevention becomes insufficient in some cases. On the other hand, when a thickness of a lubricating film is greater than 40 μm, a problem that a fastening amount becomes insufficient, and gas tightness is reduced due to interference threads, a problem that, when a surface pressure is enhanced in order to maintain gas tightness, galling is easily generated, and a defect that a solid lubricating film is easily peeled are feared, but a solid lubricating film having such the thickness may be used depending on a geometrical shape of a thread. From a viewpoint of reduction in discharge to the environment as much as possible, economical property, galling resistance, and rust preventing property, a film thickness of a solid lubricating film is preferably 10 μm or more and 40 μm or less.

(3-6) Coating

At formation of a solid film, it is desirable to pre-heat a contact surface preferably to a temperature of 50 to 200° C., and coat a coating solution on the surface. Thereby, dripping of a coating solution and ununiformity of a film thickness are reduced, and galling resistance can be further stabilized. When a temperature is lower than 50° C., these effects are small and, when a temperature exceeds 200° C., robust formation of a film is inhibited in some cases. A method of coating a solid lubricating film of the present invention may be according to the known suitable method such as brush coating, immersion treatment and air spraying method.

(3-7) Third Component

Various additives including a rust preventing agent may be added to a solid lubricating film in such a range that galling resistance is not deteriorated. For example, by adding one kind or two or more kinds of a zinc powder, a chromium pigment, silica, and an alumina pigment, rust preventing property of a solid lubricating film itself can be improved. Besides, an oxidation preventing agent, and a coloring agent may be appropriately added in such a range that the object and the effect of the present invention are not deteriorated.

<4. Film Forming Site>

The above-explained solid lubricating film can be formed on a contact surface of one or both of a pin and a box. Since the object of the present invention is sufficiently attained only by forming the film on one contact surface, it is economical to form the film only one of the pin and the box. In this case, work of forming the film is easy in the case of the box.

A contact surface of other member (preferably pin) on which a solid lubricating film of the present invention is not formed, may be uncovered. In particular, as shown in FIG. 1, when a pin and a box are transiently fastened at assembling, since even if a contact surface of other member such as the pin is naked, this is adhered to a film formed on a contact surface of the box at assembling, rust on a contact surface of the pin can be also prevented.

However, at assembling, a box is attached to only a pin at a one side end part of an oil well pipe, and other end of the pin is exposed. For this reason, in particular, in order to impart rust preventing property, or rust preventing property and lubricating property to such the exposed pin, appropriate surface treatment can be performed to form a film. Of course, even when other contact surface is not exposed, a film may be formed on this surface.

Examples of such the film include, in addition to a porous zinc or zinc alloy layer utilized as undercoating treatment of the present invention, a metal plating film, a phosphate film, an oxalate film, and a borate film, as well as an inorganic ceramics-based film (e.g. a ladent film comprising an ultrafine particle laminate containing chromium oxide as a main component) and a rust preventing film. Among these films, a porous zinc or zinc alloy film, a metal plating film and a rust preventing film have high rust preventing property-imparting effect, and other films have the high effect of improving sliding property.

A metal plating film may be, for example, zinc plating, zinc alloy plating, nickel plating, copper plating or copper tin plating. Examples of a phosphate film include a manganese phosphate film, a zinc phosphate film, a calcium zinc phosphate film and an iron zinc phosphate film. An oxalate film is such that a film of metal oxalate such as iron oxalate ($FeC_2O_4$) and nickel oxalate ($NiC_2O_4$) is formed by immersion in an aqueous oxalic acid ($C_2H_2O_4$) solution. A borate film may be a film of metal borate such as potassium borate. An amount of these films to be adhered may be as in the previous these films, and may be determined so that rust preventing property and/or lubricating property can be sufficiently imparted, and the amount does not become excessive. These films may be bi- or more-layered such that a phosphate, oxalate or borate film is formed on a porous zinc or zinc alloy layer or a metal plating film. As a rust preventing film, any film can be of course used whether drying or non-drying as far as there is no harmfulness on environment and a human body.

EXAMPLES

The present invention will be explained in more detail below by way of Examples. Hereinafter, a contact surface of a threaded part and a metal contact part of a pin is referred to as "pin surface", and a surface of both of a threaded part and a metal contact part of a box is referred to as "box surface".

Pin and box surfaces of a threaded joint (external diameter: 17.78 cm (7 inch), wall thickness: 1.036 cm (0.408 inch)) comprising a carbon steel A, a Cr—Mo steel B, a 13% Cr steel C and a high alloy steel D shown in Table 1 were subjected to surface treatment shown in Tables 2 and 3. Formation of a solid lubricating film was performed after a film forming surface had been heated to a temperature of about 50° C. in advance except for Example 10 and Comparative Example 1. Table 4 shows fastening conditions, and Table 5 shows galling and harmfulness on a human body and environment. In addition, rust preventing property was assessed by forming each solid lubricating film on a separately prepared coupon test piece (70 mm×150 mm×2 mm thickness), and performing a wetting test (temperature 50° C., humidity 98%, 200 hours). As a result, it was confirmed that rust is not generated in all Examples.

TABLE 1

Chemical composition of screw joint

| Symbol | C | Si | Mn | P | S | Cu | Ni | Cr | Mo |
|--------|------|------|-----|------|------|------|------|------|------|
| A | 0.24 | 0.3 | 1.3 | 0.02 | 0.01 | 0.04 | 0.07 | 0.17 | 0.04 |
| B | 0.25 | 0.25 | 0.8 | 0.02 | 0.01 | 0.04 | 0.05 | 0.95 | 0.18 |
| C | 0.19 | 0.25 | 0.8 | 0.02 | 0.01 | 0.04 | 0.1 | 13 | 0.04 |
| D | 0.02 | 0.3 | 0.5 | 0.02 | 0.01 | 0.5 | 7 | 25 | 3.2 |

(Note)
A content is in % by mass.
A balance is Fe and inevitable impurities.

TABLE 2

| | Pin | | Box | | Steel | Condition of heat- |
|---|---|---|---|---|---|---|
| No. | Undercoating treatment | Solid lubricating film | Undercoating treatment | Solid lubricating film | composition | treating solid lubricating film |
| Example 1 | Griding finishing (R = 3) | None | 1. Griding finishing (R = 3) | Epoxy resin Graphite(M = 0.6) Copper powder(N = 1.2) (t = 30) | A | 180° C., 30 minutes |
| Example 2 | 1. Griding finishing (R = 3) 2. Zn phosphate (R = 10) (t = 15) | None | 1. Griding finishing (R = 3) 2. Mn phosphate (R = 10) (t = 15) | Epoxy resin Graphite(M = 1.0) Copper powder(N = 0.5) (t = 15) | B | 180° C., 30 minutes |

TABLE 2-continued

| | Pin | | Box | | Steel | Condition of heat- |
| --- | --- | --- | --- | --- | --- | --- |
| No. | Undercoating treatment | Solid lubricating film | Undercoating treatment | Solid lubricating film | composition | treating solid lubricating film |
| Example 3 | Griding finishing (R = 3) | None | 1. Sand blast (R = 10) 2. Copper plating (t = 5) | Epoxy resin Mica(M = 2.0) Copper powder(N = 1.0) (t = 20) | C | 180° C., 30 minutes |
| Example 4 | Griding finishing (R = 3) | None | 1. Griding finishing (R = 3) 2. Zinc impact plating (t = 7) | Polyamideimide resin Graphite(M = 4.0) Copper powder(N = 2.5) (t = 30) | D | 260° C., 30 minutes |
| Example 5 | 1. Griding finishing (R = 3) 2. Zn phosphate (R = 10) (t = 15) | Epoxy resin Graphite (M = 1.0) Copper powder (N = 0.5) (t = 20) | 1. Griding finishing (R = 3) 2. Mn phosphate (R = 10) (t = 12) | Epoxy resin Graphite(M = 1.0) Copper powder(N = 0.5) (t = 20) | B | Both of pin and box are 180° C. and 30 minutes. |
| Example 6 | 1. Griding finishing (R = 3) 2. Zn phosphate (R = 10) (t = 15) | Ti—O Graphite (M = 3.0) Copper powder (N = 0.8) (t = 40) | 1. Griding finishing (R = 3) 2. Mn phosphate (R = 10) (t = 15) | Ti—O Graphite(M = 3.0) Copper powder(N = 0.8) (t = 40) | B | In both of pin and box, after allowed to stand for 3 hours in air, hot air at 150° C. was blown for 10 minutes. |
| Example 7 | 1. Griding finishing (R = 3) 2. Zn phosphate (R = 10) (t = 15) | None | 1. Griding finishing (R = 3) 2. Mn phosphate (R = 10) (t = 15) | Epoxy resin Calcium carbonate, kaolin(M = 7.5) Copper powder(N = 4.0) (t = 15) | B | 180° C., 30 minutes |
| Example 8 | 1. Griding finishing (R = 3) 2. Zn phosphate (R = 10) (t = 15) | None | 1. Griding finishing (R = 3) 2. Mn phosphate (R = 10) (t = 15) | Epoxy resin Calcium carbonate, kaolin(M = 7.5) Copper powder(N = 5.5) (t = 15) | B | 180° C., 30 minutes |
| Example 9 | 1. Griding finishing (R = 3) 2. Zn phosphate (R = 10) (t = 15) | None | 1. Griding finishing (R = 3) 2. Mn phosphate (R = 10) (t = 15) | Epoxy resin Graphite(M = 1.0) Copper powder(N = 1.2) (t = 15) | B | None |
| Example 10 | 1. Griding finishing (R = 3) 2. Zn phosphate (R = 10) (t = 15) | None | 1. Griding finishing (R = 3) 2. Mn phosphate (R = 10) (t = 15) | Epoxy resin Graphite(M = 1.0) Copper powder(N = 1.2) (t = 15) | B | 180° C., 30 minutes (No pre-heating) |

(Note)
(1)Ti—O indicates an inorganic polymer compound having a skeleton of Ti—O.
(2)R represents surface roughness Rmax(μm), and t indicates a film thickness(μm).
(3)M represents a mass ratio of a lubricant powder content letting a binder to be 1, and N represents a mass ratio of an copper powder letting a content of a lubricant powder to be 1, respectively.

TABLE 3

| | Pin | | Box | | Steel | Condition of heat- |
| --- | --- | --- | --- | --- | --- | --- |
| No. | Undercoating treatment | Solid lubricating film | Undercoating treatment | Solid lubricating film | composition | treating for solid lubricating film |
| Comparative example 1 | Griding finishing (R = 3) | None | 1. Grinding finishing (R = 3) 2. Mn phosphate (t = 12) | Compound grease prescribed in API Standard BUL 5A2 | A | |
| Comparative example 2 | Griding finishing (R = 3) | None | 1. Griding finishing (R = 3) 2. Mn phosphate (t = 15) | Polyamideimide resin MoS 2 (M = 1) (t = 25) | B | 260° C., 30 minutes |
| Comparative example 3 | 1. Griding finishing (R = 3) 2. Zn phosphate (R = 10) (t = 15) | None | 1. Griding finishing (R = 3) 2. Mn phosphate (R = 10) (t = 15) | Epoxy resin Graphite (M = 1.0) (t = 15) | B | 180° C., 30 minutes |

(Note)
(1) R represents surface roughness Rmax(μm), and t represents a film thickness(μm).
(2) M represents a relative value of a content of solid lubricant powder letting a binder to be 1.

TABLE 4

| Fastening condition | |
|---|---|
| Fastening rate | 10 rpm |
| Fastening torque | 14 kN·m |

TABLE 5

| | No. | Galling occurence situation (1) (Numerical value: fastening times) | | | | | | | | | | Harmfulness on human body and environment |
|---|---|---|---|---|---|---|---|---|---|---|---|---|
| | | 1 | 2 | 3 | 4 | 5 | 6 | 7 | 8 | 9 | 10 | |
| Example | 1 | ○ | ○ | ○ | ○ | ○ | ○ | ○ | ○ | ○ | ○ | None |
| | 2 | ○ | ○ | ○ | ○ | ○ | ○ | ○ | ○ | ○ | ○ | None |
| | 3 | ○ | ○ | ○ | ○ | ○ | ○ | ○ | ○ | ○ | ○ | None |
| | 4 | ○ | ○ | ○ | ○ | ○ | ○ | ○ | ○ | ○ | ○ | None |
| | 5 | ○ | ○ | ○ | ○ | ○ | ○ | ○ | ○ | ○ | ○ | None |
| | 6 | ○ | ○ | ○ | ○ | ○ | ○ | ○ | ○ | Δ | Δ | None |
| | 7 | ○ | ○ | ○ | ○ | ○ | ○ | ○ | Δ | Δ | Δ | None |
| | 8 | ○ | ○ | ○ | ○ | ○ | ○ | Δ | Δ | Δ | X | None |
| | 9 | ○ | ○ | ○ | ○ | ○ | ○ | Δ | Δ | Δ | X | None |
| | 10 | ○ | ○ | ○ | ○ | ○ | ○ | Δ | Δ | Δ | X | None |
| Comparative Example | 1 | ○ | ○ | ○ | ○ | ○ | ○ | ○ | ○ | Δ | Δ | Presence (Including heavy metal such as lead) |
| | 2 | ○ | ○ | ○ | ○ | ○ | ○ | Δ | Δ | Δ | X | Presence (Possible generation of sulfuric acid gas) |
| | 3 | ○ | ○ | ○ | ○ | Δ | Δ | X | — | — | — | None |

(Note)
(1) ○: No occurence of galling, Δ: Slight occurence of galling (galling flaw was repaired, and re-fastening is possible), X: Great occurence of galling (repairing is impossible), —: Not implemented Example 1

A threaded joint made of a carbon steel having a composition A shown in Table 1 was subjected to the following surface treatment A box surface was subjected to mechanical grinding finishing (surface roughness 3 μm), and a solid lubricating film having a thickness of 30 μm comprising an epoxy resin containing a graphite powder having an average particle diameter of 5 μm and a copper powder having a maximum length of 15 μm which had been inactivated by surface treatment was formed thereon. A solid lubricating film was a film containing 0.6 of graphite relative to 1 of an epoxy resin, and 1.2 of a copper powder relative to 1 of graphite expressed by a mass ratio. After formation of the solid lubricating film, this was heat-treated at 180° C. for 30 minutes to harden the film. A pin surface was subjected to only mechanical grinding finishing (surface roughness 3 μm). In a fastening and loosening test, a galling did not occur in ten times fastening and loosening in Table 5, being extremely favorable. Of course, it goes without saying that graphite, a copper powder and an epoxy resin in an example of the present invention are harmless on environment and a human body, and discharge into environment is slight as compared with use of the previous grease in Comparative Example 1 described later.

Example 2

A threaded joint made of a Cr—Mo steel having a composition B shown in Table 1 was subjected to the following surface treatment. A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 15 μm on the surface, and a solid lubricant film having a thickness of 15 μm comprising an epoxy resin containing a graphite powder having an average particle diameter of 10 μm and a copper powder having a greatest length of 15 μm was further formed thereon. The solid lubricating film was a film containing 1 of graphite relative to 1 of an epoxy resin, and 0.5 of a copper powder relative to 1 of graphite expressed by a mass ratio. After formation of a solid lubricating film, this was heat-treated at 180° C. for 30 minutes to harden a film. A pin surface was subjected to mechanical grinding finishing (surface roughness 3 μm), and immersed in a zinc phosphate chemical treating solution at 75 to 85° C. for 10 minutes to form a zinc phosphate film having a thickness of 15 μm. In a fastening and loosening test, a galling did not occur in ten times fastening and loosening in Table 5, being extremely favorable.

Example 3

A threaded joint made of a 13Cr steel having a composition C shown in Table 1 was subjected to the following surface treatment. A No. 80 sand was blown to a box surface to adjust surface roughness to 10 μm, copper plating having a thickness of about 5 μm was formed thereon, and a solid lubricating film having a thickness of 20 μm comprising an epoxy resin containing a mica powder having an average particle diameter of 2 μm and a copper powder having a greatest length of 10 μm was further formed thereon. The solid lubricating film was a film containing 2 of mica relative to 1 of an epoxy resin, and 1 of a copper powder relative to 1 of mica expressed by a mass ratio. After formation of the solid lubricating film, this was heat-treated at 180° C. for 30 minutes to harden the film. A pin surface was subjected to only mechanical grinding finishing (surface roughness 3 μm). In a fastening and loosening test, a galling did not occur in ten times fastening and loosening in Table 5, being extremely favorable.

Example 4

A threaded joint made of a high alloy having a composition D shown in Table 1 was subjected to the following surface treatment. A box surface was subjected to mechanical grinding finishing (surface roughness 3 μm), a porous zinc impact plating of 7 μm was formed by a projection plating method using a particle in which covering is zinc, and a solid lubricating film having a thickness of 30 μm comprising a polyamideimide resin containing a graphite powder having an average particle diameter of 5 μm and a copper powder having a greatest length of 10 μm was formed thereon. The solid lubricating film was a film containing 4 of graphite relative to 1 of a polyamideimide resin, and 2.5 of a copper powder relative to 1 of graphite expressed by a mass ratio. After formation of the solid lubricating film, this was heat-treated at 260° C. for 30 minutes to harden the film. A pin surface was subjected to only mechanical grinding finishing (surface roughness 3 μm). In a fastening and loosening test, a galling did not occur in ten times fastening and loosening in Table 5, being extremely favorable.

Example 5

A threaded joint made of a Cr—Mo steel having a composition B shown in Table 1 was subjected to the following surface treatment. A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 12 μm on the surface, and a solid lubricating film having a thickness of 20 μm comprising an epoxy resin containing a graphite powder having an average particle diameter of 10 μm and a copper powder having a greatest length of 10 μm was further formed thereon. The solid lubricating film was a film containing 1 of graphite relative to 1 of an epoxy resin, and 0.5 of a copper powder relative to 1 of graphite expressed by a mass ratio. A pin surface was subjected to mechanical grinding finishing (surface roughness 3 μm), only a threaded part at a pipe end was immersed in a zinc phosphate chemical treating solution at 80 to 95° C. for 15 minutes to form a zinc phosphate film layer having a thickness of 15 μm, and the same solid lubricating film as the solid lubricating film formed on a box was further formed thereon. After formation of the solid lubricating film on both of the pin and the box, this was heat-treated at 180° C. for 30 minutes to harden the film. In a fastening and loosening test, a galling did not occur in ten times fastening and loosening in Table 5, being extremely favorable.

Example 6

A threaded joint made of Cr—Mo having a composition B shown in Table 1 was subjected to the following surface treatment. A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 12 μm on the surface, and a solid lubricating film of 40 μm comprising an inorganic polymer compound with a skeleton of Ti—O containing a graphite powder having an average particle diameter of 10 μm and a copper powder having a greatest length of 10 μm was further formed thereon. The solid lubricating film was a film containing 3 of graphite relative to 1 of an inorganic polymer compound with a skeleton of Ti—O, and 0.8 of a copper powder relative to 1 of graphite expressed by a mass ratio. The solid lubricating film was formed by coating a coating solution in which graphite and a copper powder had been dispersed in a solution obtained by titanium isopropoxide in a mixed solvent of xylene:butyl alcohol:trichloroethylene=3:1:3 to have a proportion above in terms of $TiO_2$, allowing to stand this in the air for 3 hours to perform moistening treatment, and blowing the hot air at 150° C. for 10 minutes. A pin surface was subjected to mechanical grinding finishing (surface roughness 3 μm), only a threaded part at a pipe end was immersed in a zinc phosphate chemical treating solution at 80 to 95° C. for 15 minutes to form a zinc phosphate film layer having a thickness of 15 μm, and the same solid lubricating film as the solid lubricating film formed on a box was further formed thereon. In a fastening and loosening test, a slight galling occurred at ninth and tenth completion in ten times fastening and loosening in Table 5, but by repairing, the fastening and loosening was possible until tenth time.

Example 7

A threaded joint made of a carbon steel having a composition A shown in Table 1 was subjected to the following surface treatment. A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 12 μm, and a solid lubricating film having a thickness of 15 μm comprising an epoxy resin containing a lubricating powder containing a calcium carbonate powder having an average particle diameter of 12 μm and kaolin having an average particle diameter of 10 μm at the same ratio, and a copper powder having a greatest length of 10 μm was further formed thereon. The solid lubricating film was a film containing a total of 7.5 of calcium carbonate and kaolin relative to 1 of an epoxy resin, and 4.0 of a copper powder relative to a total of 1 of calcium carbonate and kaolin expressed by a mass ratio. After formation of the solid lubricating film, this was heat-treated at 180° C. for 30 minutes to harden the film. A pin surface was subjected to only mechanical grinding finishing (surface roughness 3 μM). In a fastening and loosening test, a slight galling occurred at eighth time or later in ten times fastening and loosening in Table 5, but repairing, the fastening and loosening could be performed until tenth time. This indicates that, when a mass ratio of a copper powder relative to a total of 1 of calcium carbonate and kaolin exceeds 3, a strength of a solid lubricating film is slightly reduced. However, this is a level having no problem as galling resistance performance.

Example 8

A threaded joint made of a Cr—Mo steel having a composition B shown in Table 1 was subjected to the following surface treatment A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 15 μm, and a solid lubricating film of a thickness of 15 μm comprising an epoxy resin containing a graphite powder having an average particle diameter of 10 μm and a copper powder of a greatest length of 15 μm was further formed thereon. The solid lubricating film was a film containing a total of 7.5 of calcium carbonate and kaolin relative to 1 of an epoxy resin, and 5.5 of a copper powder relative to a total of 1 of calcium carbonate and kaolin expressed by a mass ratio. After formation of the solid lubricating film, this was heat-treated at 180° C. for 30 minutes to harden the film. A pin surface was subjected to only mechanical grinding finishing (surface roughness 3 μm). In a fastening and loosening test, a slight galling occurred at seventh, eighth and ninth time in ten times fastening and loosening in Table 5, and repairing was performed to continue fastening and loosening, but a great galling occurred at tenth time. This indicates that, when a mass ratio of a copper powder relative to a total 1 of calcium carbonate and kaolin which is a lubricating powder exceeds 5, a strength of a solid lubricating film is reduced as in Example 8. However, this is a level comparable to that of the previous Comparative Examples 1 and 2 as a galling resistance performance.

Example 9

A threaded joint made of a Cr—Mo steel having a composition B shown in Table 1 was subjected to the following surface treatment A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 15 μm on the surface, and a solid lubricating film having a thickness of 15 μm comprising an epoxy resin containing a graphite powder having an average particle diameter of 10 μm and a copper powder having a greatest length of 15 μm was further formed thereon. The solid lubricating film was a film containing 1 of graphite relative to 1 of an epoxy resin, and 1.2 of a copper powder relative to 1 of graphite expressed by a mass ratio. Heat treatment after formation of the solid lubricating film was not performed. A pin surface was subjected to mechanical grinding finishing (surface roughness 3 μm), and this was immersed in a zinc phosphate chemical treating solution at 75 to 85° C. for 10 minutes to form a zinc phosphate film having a thickness of 15 μm. In a fastening and loosening test, a slight galling occurred at seventh, eighth and ninth time in ten times fastening and loosening in Table 5, and repairing was performed to continue fastening and loosening, but a great galling occurred at tenth time. This is presumed that since heat treatment was not performed after formation of a solid lubricating film, a strength of the solid lubricating film was reduced as compared with Example 2 of the present invention, and galling resistance performance was inferior. However, this is a level comparable with that of the previous Comparative Examples 1 and 2 as galling resistance performance.

Example 10

A threaded joint made of a Cr—Mo steel having a composition B shown in Table 1 was subjected to the following surface treatment A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 15 μm on the surface, and a solid lubricating film having a thickness of 15 μm comprising an epoxy resin containing a graphite powder having an average particle diameter of 10 μm and a copper powder of a greatest length of 15 μm was further formed thereon. The solid lubricating film was a film containing 1 of graphite relative to 1 of an epoxy resin, and 1.2 of a copper powder relative to 1 of graphite expressed by a mass ratio. Upon formation of a solid lubricating film, a contact surface was not pre-heated, but formation was performed at room temperature. A pin surface was subjected to mechanical grinding finishing (surface roughness 3 μm), this was immersed in a zinc phosphate chemical treating solution at 75 to 85° C. for 10 minutes to form a zinc phosphate film having a thickness of 15 μm. In a fastening and loosening test, a slight galling occurred at eighth and ninth time in ten times fastening and loosening in Table 5, and repairing was performed to continue fastening and loosening, but a great galling occurred at tenth time. This is presumed that since upon formation of a solid lubricating film, this was performed without pre-heating a contact surface, formation of a film took a time, a film thickness became slightly ununiform due to dripping. However, this is a level comparable to that of the previous Comparative Examples 1 and 2 as galling resistance performance.

Comparative Example 1

A threaded joint made of a carbon steel having a composition A shown in Table 1 was subjected to the following surface treatment A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 15 μm on the surface. As a lubricant, a compound grease according to API Standard was coated. A pin surface was subjected to only mechanical grinding finishing (surface roughness 3 μm). In a fastening and loosening test, a galling did not occur until eighth time in ten times fastening and loosening in Table 5. However, at ninth time, a slight galling occurred, but by repairing, fastening and loosening was performed until tenth time to complete a test.

Comparative Example 2

A threaded joint made of a Cr—Mo steel having a composition B shown in Table 1 was subjected to the following surface treatment A box surface was subjected to mechanical grinding finishing (surface roughness 2 μm), then, a surface thereof was immersed in a manganese phosphate chemical treating solution at 80 to 95° C. for 10 minutes to form a manganese phosphate film having a thickness of 15 μm on the surface, and a solid lubricating film of a thickness of a 25 μm comprising a polyamideimide resin containing a molybdenum disulfide powder having an average particle diameter of 5 μm was formed thereon. A solid lubricating film was a film containing 2 of molybdenum disulfide relative to 1 of a polyamideimide resin expressed by a mass ratio. A solid lubricating film of 10 μm comprising an inorganic polymer compound with a skeleton of Ti—O containing a molybdenum disulfide powder having an average particle diameter of 5 μm and a tungsten disulfide powder having an average particle diameter of 3 μm was formed thereon. After formation of a solid lubricating film, this was heat-treated at 260° C. for 30 minutes to harden the film. In a fastening and loosening test, a galling did not occur until sixth time in ten times fastening and loosening in Table 5. However, a slight galling occurred at seventh time, repairing was performed to continue fastening and loosening until ninth time, but a vigorous galling occurred at tenth time.

Comparative Example 3

A threaded joint made of a Cr—Mo steel having a composition B shown in Table 1 was subjected to the following surface treatment. A box surface was subjected to mechanical grinding finishing (surface roughness 3 μm), then, a surface thereof was immersed in a manganese phosphate chemical treating solution at 80 to 95° C. for 10 minutes to form a manganese phosphate film having a thickness of 15 μm on the surface, and a solid lubricating film having a thickness of 15 μm comprising an epoxy resin containing only a graphite powder having an average particle diameter of 10 μm was further formed thereon. A solid lubricating film was a film containing 1 of graphite relative to 1 of an epoxy resin expressed by a mass ratio. After formation of a solid lubricating film, this was heat-treated at 180° C. for 30 minutes to harden the film. A pin surface was subjected to mechanical grinding finishing (surface roughness 3 μm), and immersed in a zinc phosphate chemical treating solution at 75 to 85° C. for 10 minutes to form a zinc phosphate film having a thickness of 15 μm. In a fastening and loosening test, a galling did not occur until fourth time in ten times fastening and loosening in Table 5. However, at fifth time, a slight galling occurred, repairing was performed to continue fastening and loosening until sixth time, but at seventh time, a vigorous galling occurred, and a test was completed.

As described above, the present invention was explained in association with embodiments which are most practical and are thought to be preferable at present, but the present invention is not limited to embodiments disclosed in the present description, an appropriate variation is possible in such a range that it is not contrary to the gist or the idea of the invention read from claims and the whole description, and it should be understood that a threaded joint for a steel pipe accompanied with such the variation, and a process for manufacturing the same are included in the technical range of the present invention.

The invention claimed is:

1. A threaded joint for a steel pipe comprising a pin and a box with a contact surface having a threaded part and an unthreaded metal contact part,
   wherein a solid lubricating film containing at least: a copper powder of which length of the longest part is 1 to 20 μm; a binder, and one or more kinds of lubricating powders selected from the group consisting of graphite, mica, calcium carbonate and kaolin, is formed on at least one contact surface of the pin and the box,
   the copper powder is dispersed in the solid lubricating film,
   wherein a surface of the copper powder is inactivation-treated, thereby the copper powder has a copper oxide film, a copper sulfide film, or a film of a metal inactivating agent selected from benzotriazole or thiazole on the surface of the copper powder, and
   the solid lubricating film is substantially free from molybdenum disulfide and tungsten disulfide.

2. The threaded joint for a steel pipe according to claim 1, wherein a mass ratio (C/B) of a content (C) of a copper powder to a content (B) of the lubricating powder in the solid lubricating film is 0.5 to 5.0.

3. The threaded joint for a steel pipe according to claim 1, wherein the solid lubricating film is formed on the contact surface of the box.

4. The threaded joint for a steel pipe according to claim 1, wherein the solid lubricating film is formed on only the contact surface of one of the pin and the box, and monolayered or di- or more layered films selected from the group consisting of a zinc or zinc alloy film, a metal plating film, a phosphate film, an oxalate film, a borate film and a rust preventing film is formed on the other contacting surface.

5. The threaded joint for a steel pipe according to clam 1, wherein the solid lubricating film is formed on the contact surface which has been subjected to any undercoating treatment selected from the group consisting of acid washing treatment, blasting treatment, zinc or zinc alloy impact plating treatment, metal plating treatment, soft nitrification treatment, composite metal covering treatment, phosphate treatment and oxalate treatment.

6. The threaded joint for a steel pipe according to claim 1, wherein the solid lubricating film formed on the contact surface is heat-treated.

7. A method of forming the solid lubricating film on the contact surface of the threaded joint for a steel pipe as defined in claim 1, which comprises pre-heating the contact surface on which the solid lubricating film is to be formed.

* * * * *